United States Patent
Lee et al.

(10) Patent No.: US 7,026,949 B2
(45) Date of Patent: Apr. 11, 2006

(54) METHOD FOR TRANSMITTING AND RECEIVING MESSAGES IN HOME APPLIANCE NETWORKING SYSTEM

(75) Inventors: Sang Kyun Lee, Kwangmyung-si (KR); Ki Tae Oh, Kwangmyung-si (KR); Yeon Kyung Lee, Koyang-si (KR); Chang Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 10/134,605

(22) Filed: Apr. 30, 2002

(65) Prior Publication Data

US 2002/0171533 A1 Nov. 21, 2002

(30) Foreign Application Priority Data

May 2, 2001 (KR) ............................... 2001-23862
May 15, 2001 (KR) ............................... 2001-26515

(51) Int. Cl.
*G05B 19/02* (2006.01)
*H04B 7/14* (2006.01)

(52) U.S. Cl. ........................... 340/825.22; 340/825.28; 370/279

(58) Field of Classification Search ........... 340/825.52, 340/3.52, 3.53, 10.32, 825.24, 825.25, 3.1, 340/10.42, 825.22, 825.28, 825.07; 709/220–222, 709/249; 370/333, 282, 278, 279, 102.2, 370/462; 714/748–749; 455/151.1, 353
See application file for complete search history.

(56) References Cited

U.S. PATENT DOCUMENTS

| | | | | |
|---|---|---|---|---|
| 4,322,842 | A | * | 3/1982 | Martinez .................... 370/204 |
| 4,713,837 | A | * | 12/1987 | Gordon ................. 379/106.07 |
| 5,122,948 | A | * | 6/1992 | Zapolin .................... 340/3.53 |
| 5,352,957 | A | * | 10/1994 | Werner ....................... 315/291 |
| 5,544,036 | A | * | 8/1996 | Brown et al. .......... 340/825.24 |
| 5,604,486 | A | * | 2/1997 | Lauro et al. ............... 340/10.3 |
| 5,715,261 | A | * | 2/1998 | Schmeltzer et al. ........ 714/807 |
| 5,815,082 | A | * | 9/1998 | Welmer ..................... 340/3.51 |
| 5,909,183 | A | * | 6/1999 | Borgstahl et al. ....... 340/825.22 |
| 6,081,519 | A | * | 6/2000 | Petler ......................... 370/356 |
| 6,167,046 | A | * | 12/2000 | Terada et al. ............... 370/389 |
| 6,502,411 | B1 | * | 1/2003 | Okamoto ..................... 62/129 |
| 6,633,781 | B1 | * | 10/2003 | Lee et al. ..................... 700/19 |
| 6,721,291 | B1 | * | 4/2004 | Bergenwall et al. ........ 370/331 |

* cited by examiner

*Primary Examiner*—Michael Horabik
*Assistant Examiner*—Kimberly Jenkins
(74) *Attorney, Agent, or Firm*—Birch, Stewart, Kolasch & Birch, LLP

(57) ABSTRACT

A method for transmitting and receiving messages in a home appliance networking system, wherein a first home appliance connected to a network appends a unique message identification number to a header of a message and transmits the resulting message to a second home appliance connected to the network. Messages transmitted and received among a plurality of home appliances can be distinguished from one another, resulting in a reduction in message transfer errors. Moreover, as needed, a group code corresponding to a specific group of home appliances may be appended to a transmitter message for control of the specific group so that the home appliances can be conveniently and efficiently controlled at one time.

13 Claims, 5 Drawing Sheets

METHOD FOR TRANSMITTING AND RECEIVING MESSAGES IN HOME APPLIANCE NETWORKING SYSTEM

BACKGROUND OF THE INVENTION

1. Field of the Invention

The present invention relates to methods for transmitting and receiving messages in home appliance networking systems, and more particularly to a method for transmitting and receiving messages in a home appliance networking system, wherein a home appliance appends a unique message identification number to a header of a message and transmits the resulting message to a different home appliance, thereby reducing transfer errors of messages transmitted and received among a plurality of home appliances.

2. Description of the Related Art

With the development of Internet networks, recently, most home appliances have been made to be of a multifunction type having several additional functions as well as their original functions. For example, some home appliances may be equipped with local area network (LAN) cards or modems such that they not only transmit and receive data over communication networks, but also are automatically upgraded in version. Operations of such home appliances can also be controlled from any communicatable places outside of their installed places.

Generally, communication devices are installed respectively in home appliances to transfer signals between the home appliances and transmit and receive those signals via a communication cable. Also, through the use of a communication connection service provided by an Internet service provider (ISP), an external remote system can gain access to a specific home and control home appliances therein. Service centers for such home appliances can update programs associated with the home appliances while transmitting and receiving various data to/from the home appliances through the communication connection service.

In a conventional method for transmitting and receiving messages in a home appliance networking system wherein a plurality of home appliances transmit and receive messages over a network, the plurality of home appliances are interconnected via the network and sequentially reply to request messages from different ones of them. However, this conventional message transmission/reception method has a disadvantage in that the reply order to request messages may be changed due to different processing rates or transfer rates of the request messages, thereby causing reply messages not to be properly transferred to home appliances transmitting the request messages.

In order to overcome the above problem, an address of a home appliance transmitting a request message may be appended to a reply message. In this case, an address of a low-order transfer layer must be popped up as a high-order address, resulting in a complexity in an associated software algorithm and, in turn, an increase in error occurrence probability.

SUMMARY OF THE INVENTION

Therefore, the present invention has been made in view of the above problems, and it is an object of the present invention to provide a method for transmitting and receiving messages in a home appliance networking system, wherein a home appliance appends a unique message identification number to a header of a message and transmits the resulting message to a different home appliance, thereby reducing transfer errors of messages transmitted and received among a plurality of home appliances.

In accordance with one aspect of the present invention, the above and other objects can be accomplished by the provision of a method for transmitting and receiving messages in a home appliance networking system, comprising the steps of: a) allowing a first home appliance having a transmitter message to be transmitted to append a unique number for identification of the transmitter message to a header of the message; b) allowing the first home appliance to transmit the transmitter message appended with the unique number to a second home appliance over a network; and c) allowing the second home appliance to receive the transmitter message transmitted from the first home appliance, create a receiver message in response to the received transmitter message, append the same message number as the unique number appended at the step a) to a header of the created receiver message, and then transmit the resulting receiver message to the first home appliance.

In accordance with another aspect of the present invention, there is provided a method for transmitting and receiving messages in a home appliance networking system, comprising the steps of: a) allowing a first home appliance transmitting a message over a network to append an address of a home to which a second home appliance belongs, to the message; b) allowing the first home appliance to additionally append an address of the second home appliance to the message appended with the home address; c) allowing the first home appliance to transmit the message appended with the home address and appliance address to the second home appliance; and d) controlling the second home appliance according to the transmitted message.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In general terms, messages are applied in message transmission/reception fields to transfer information, and each of them is a finite-length combination of characters, numerals or symbols. Such messages may be roughly classified into three types, a request message through which one entity requests certain information from another entity, a reply message through which reply information to the request is stored and sent, and a notification message through which nonspecific information is sent unsolicitedly with no prior request from any entity.

Figure 1:
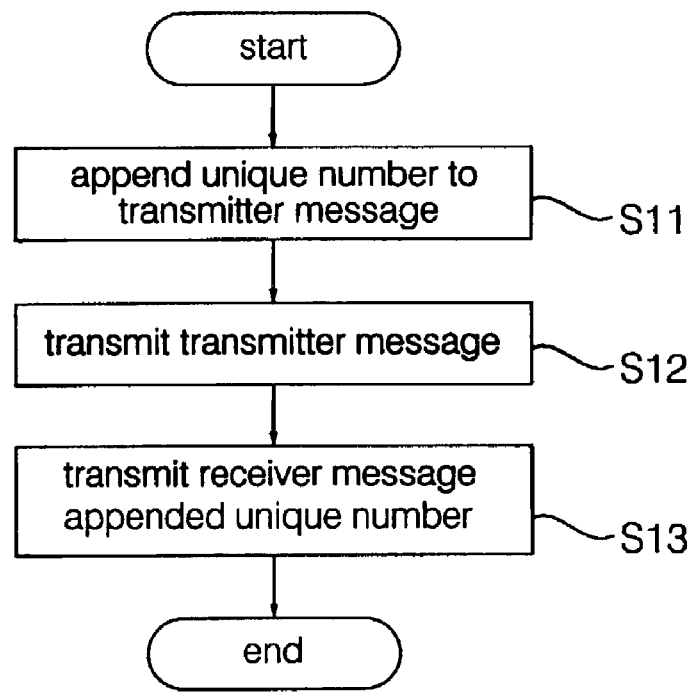
FIG. 1 is a flow chart illustrating a method for transmitting and receiving messages in a home appliance networking system in accordance with the present invention.

A description will hereinafter be given of a method for transmitting and receiving messages in a home appliance networking system wherein a plurality of home appliances are interconnected via a network and transmit and receive messages over the network, according to the present invention, with reference to a flow chart of FIG. 1.

At the first step S12, a specific home appliance having a transmitter message to be transmitted appends a unique number for identification of the appliance and message to a header of the message.

At the second step S12, the specific home appliance transmits the transmitter message appended with the unique number at the above first step S11 to a desired home appliance over the network.

At the third step S13, upon receiving the transmitter message transmitted at the above second step S12, the desired home appliance creates a receiver message in response to the received transmitter message, appends the same message number as the unique number appended at the above first step S11 to a header of the created receiver message, and then transmits the resulting receiver message to the specific home appliance.

At this time, the unique number that the specific home appliance appends to the transmitter message for identification thereof may be a duplicate of unique numbers of messages transmitted from any other home appliances. For the purpose of avoiding such a duplication, home appliances transmitting transmitter messages attach their addresses to the heads of unique numbers of the transmitter messages to enable distinction among the messages.

In other words, unique numbers appended to transmitter messages transmitted from home appliances are values arbitrarily set and assigned by the respective home appliances. For this reason, unique numbers of transmitter messages transmitted from different home appliances may be the same. In order to solve this problem, even in the case where message unique numbers are duplicate, message identification can be made by attaching addresses of home appliances transmitting transmitter messages to the heads of unique numbers of the messages.

According to the present invention, the message transmission/reception method for the home appliance networking system is classified into two types: a sequential message transmission/reception method for creating and transmitting receiver messages in response to transmitter messages transmitted from home appliances sequentially one by one in the order of transmitter message transmission such that the next transmitter message is processed after one transmission/reception process is completed; and a batch message transmission/reception method for accepting transmitter messages transmitted from a plurality of home appliances at the same time, creating receiver messages corresponding respectively to the transmitted transmitter messages according to message processing rates of the home appliances, appending corresponding unique numbers respectively to the created receiver messages and transmitting the resulting receiver messages.

In the sequential message transmission/reception method, until a specific home appliance completes one transmission/reception process by creating and transmitting a receiver message in response to one transmitter message transmitted thereto, it does not store all other transmitter messages transmitted thereto in a buffer, but discards them. As a result, the message transfer is low in rate, but high in efficiency and security.

At this time, home appliances transmitting the transmitter messages discarded by the specific home appliance retransmit those messages continuously until they are accepted by the specific home appliance.

Figure 2A:
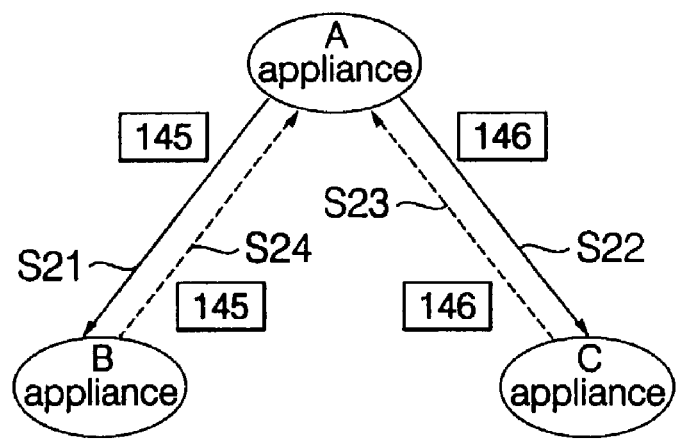
FIGS. 2a and 2b are flow charts illustrating a batch message transmission/reception method in accordance with the present invention.

Next, a detailed description will be given of the batch message transmission/reception method in accordance with the present invention with reference to flow charts of FIGS. 2a and 2b. As shown in FIG. 2a, in the case where a home appliance A connected to home appliances B and C via a network sequentially transmits a transmitter message appended with a unique number '145' to the appliance B (S21) and a transmitter message appended with a unique number '146' to the appliance C (S22), the appliance C may transmit a reply message to the appliance A earlier than the appliance B due to a difference between message transfer rates, a difference between message data processing rates, etc.

In this case, because the appliance C replies to the transmitter message corresponding to the unique number '146', it appends the unique number '146' to a receiver message and transmits the resulting receiver message to the appliance A (S23). Similarly, the appliance B appends the unique number '145' to a receiver message and transmits the resulting receiver message to the appliance A (S24).

Although the transmission order of the receiver messages or reply messages from the appliances B and C is the reverse of the transmission order of the transmitter messages or request messages from the appliance A, the messages can be accurately processed on the basis of the appended unique numbers.

Figure 2B:
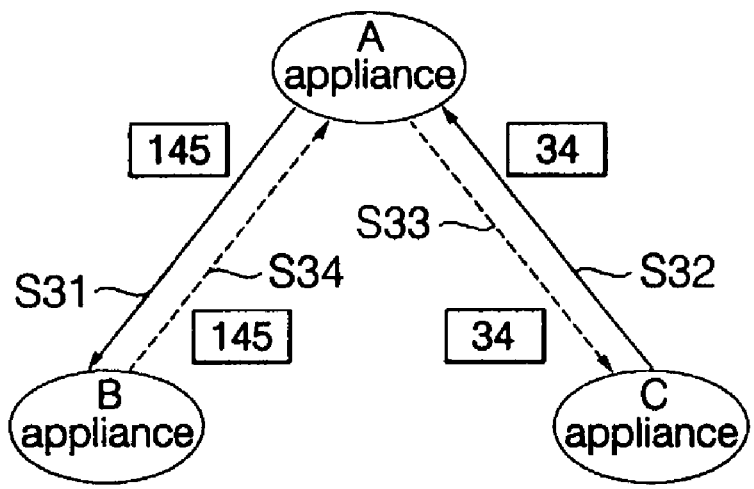

In FIG. 2b, in the case where the appliance C transmits a request message appended with a unique number '34' to the appliance A (S32) after the appliance A transmits the transmitter message appended with the unique number '145' to the appliance B (S31), reply messages may be transmitted in the reverse order to the transmission order of the request messages. In this case, the appliance A transmits a reply message appended with the unique number '34' to the appliance C (S33) and then receives a reply message appended with the unique number '145' from the appliance B (S34).

Although the transmission order of the receiver messages or reply messages to the appliance C and from the appliance B is the reverse of the transmission order of the transmitter messages or request messages from the appliances A and C, the messages can be accurately processed on the basis of the appended unique numbers.

Figure 3A:
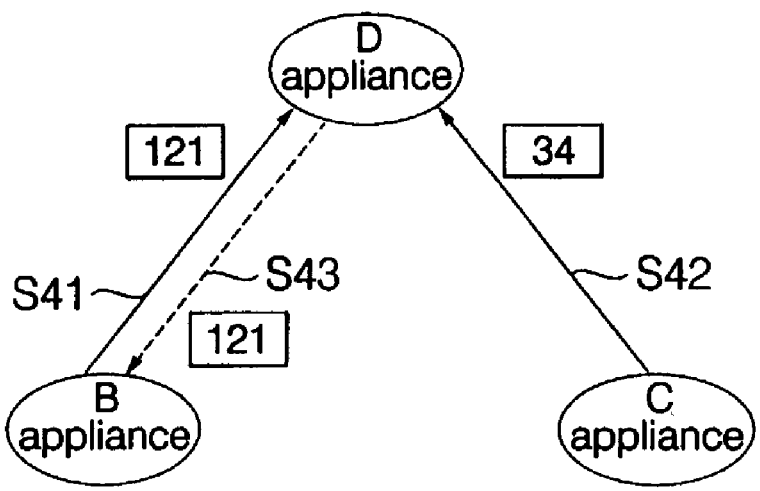
FIGS. 3a and 3b are flow charts illustrating a sequential message transmission/reception method in accordance with the present invention.
Figure 3B:
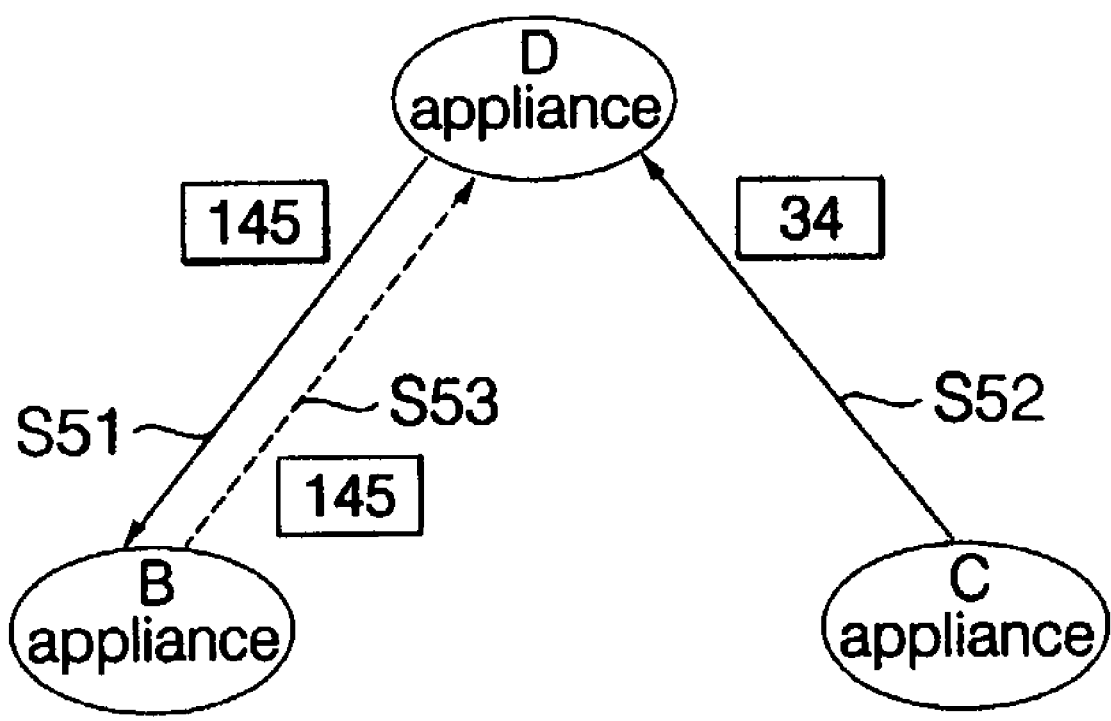

FIGS. 3a and 3b are flow charts illustrating the sequential message transmission/reception method in accordance with the present invention. As shown in FIG. 3a, when a home appliance D connected to home appliances B and C via a network receives a transmitter message appended with a unique number '34' transmitted from the appliance C (S42) while processing a transmitter message appended with a unique number '121' transmitted from the appliance B (S41), it discards the transmitter message transmitted from the appliance C and transmits a reply message appended with the unique number '121' corresponding to the appliance B to the appliance B (S43).

At this time, the appliance C transmits its transmitter message continuously until the appliance D accepts that message.

In FIG. 3b, if the appliance D receives the transmitter message appended with the unique number '34' transmitted from the appliance C (S52) while transmitting a transmitter message with a unique number '145' to the appliance B and waiting for a reply message to be transmitted from the appliance B (S51), it discards the transmitter message transmitted from the appliance C until it receives the reply message from the appliance B (S53).

As described above, the message transmission/reception method for the home appliance networking system according to the present invention can identify respective messages transmitted among home appliances by appending unique numbers respectively to headers of the messages. Therefore, even though the reply order to request messages is changed, reply messages to the respective request messages can be accurately transmitted.

Figure 4:
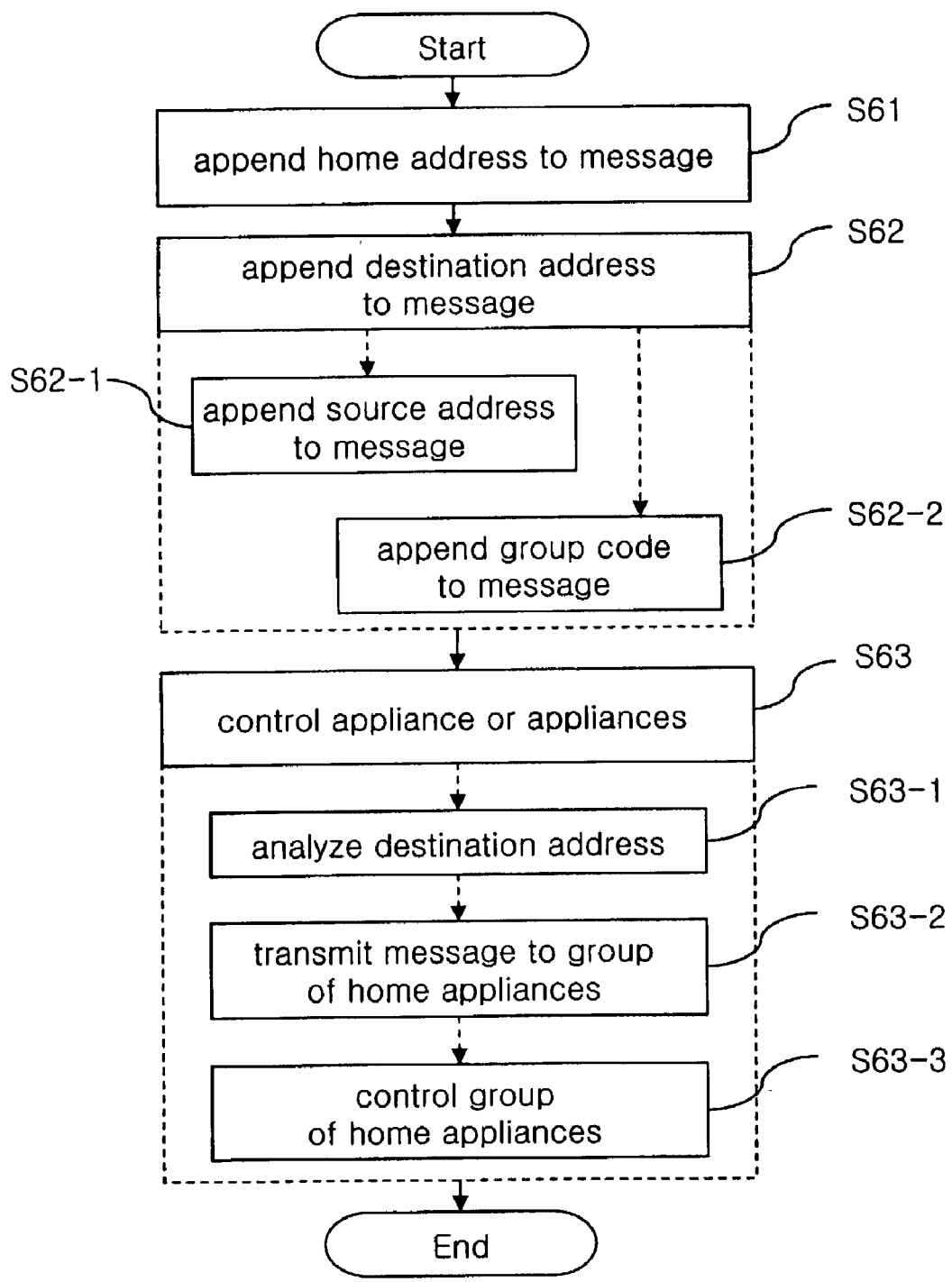
FIG. 4 is a flow chart illustrating a group control procedure of the message transmission/reception method for the home appliance networking system in accordance with the present invention.

FIG. 4 is a flow chart illustrating a group control procedure of the message transmission/reception method for the home appliance networking system in accordance with the present invention. As shown in this drawing, distinction can be made among messages transmitted and received among home appliances, which are interconnected via a network constructed in a home to transmit and receive control information and state information over the network. That is, first, an address of a home to which a destination home appliance belongs is appended to a message to be transmitted (S61). Then, a destination address of the destination home appliance is additionally appended to the message appended with the home address (S62). Thereafter, the message appended with the home address and destination address is transmitted to the destination home appliance such that the appliance is controlled according to the transmitted message (S63).

At the above step S62, a source address of a home appliance transmitting the message may preferably be additionally appended to the message (S62-1).

If necessary, a group code may be appended instead of the destination address in order to control a specific group of home appliances at one time. In this regard, at the above step S62, a group code indicating that the message must be transmitted to a specific group of home appliances may preferably be further appended to the message (S62-2).

As a result, the above step S63 may preferably include: a destination address analysis step S63-1 of analyzing the destination address appended at the above step 62 to determine whether the destination address is a group code; a group message transmission step S63-2 of transmitting the message to a group of home appliances corresponding to the group code if the destination address is determined to be the group code at the destination address analysis step S63-1; and a group control step S63-3 of controlling the home appliances of the corresponding group according to the message transmitted at the group message transmission step S63-2.

Figure 5:
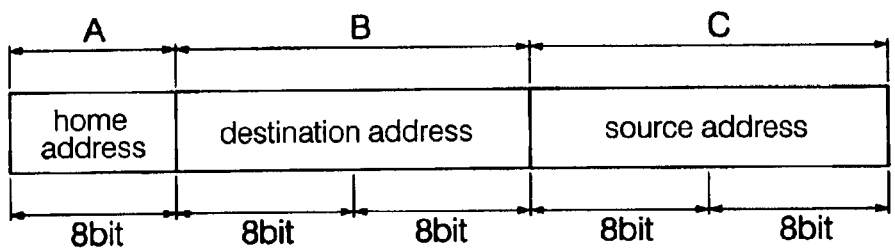
FIG. 5 is a view showing a format of each message transmitted and received in the message transmission/reception method for the home appliance networking system in accordance with the present invention.

FIG. 5 shows a format of each message transmitted and received in the message transmission/reception method for the home appliance networking system in accordance with the present invention.

As shown in FIG. 5, the first 8 bits A of each message constitute a home code which is an address of a home where a destination home appliance is located. The next 16 bits B constitute a destination address of the destination home appliance and the last 16 bits C constitute a source address of a home appliance transmitting each message.

In the case where a user desires to control a specific group of home appliances as needed, the former 8 bits of the field B shown in FIG. 5 may be filled with, for example, '11111111' indicating that the latter 8 bits of the field B are information regarding the specific group to be controlled.

Namely, the analysis result of the field B at the destination address analysis step S63-1 of the above step 63 shows that the former 8 bits of the field B are '11111111' and the latter 8 bits thereof are a group code composed of information regarding a specific group to which a message is to be transmitted. As a result, the message is transmitted to a plurality of home appliances constituting the specific group at the same time at the above step S63-2.

Accordingly, when a user desires to control a plurality of home appliances in his/her home at one time, for example, in order to power off the appliances while being outside of the home, he/she need not control the home appliances one by one. Furthermore, in some cases, besides all the home appliances in the home, the user may control a group of home appliances located in a specific area, or a group of home appliances located in a specific company. Therefore, the user can more freely select a plurality of home appliances to be controlled, at one time.

Figure 6:
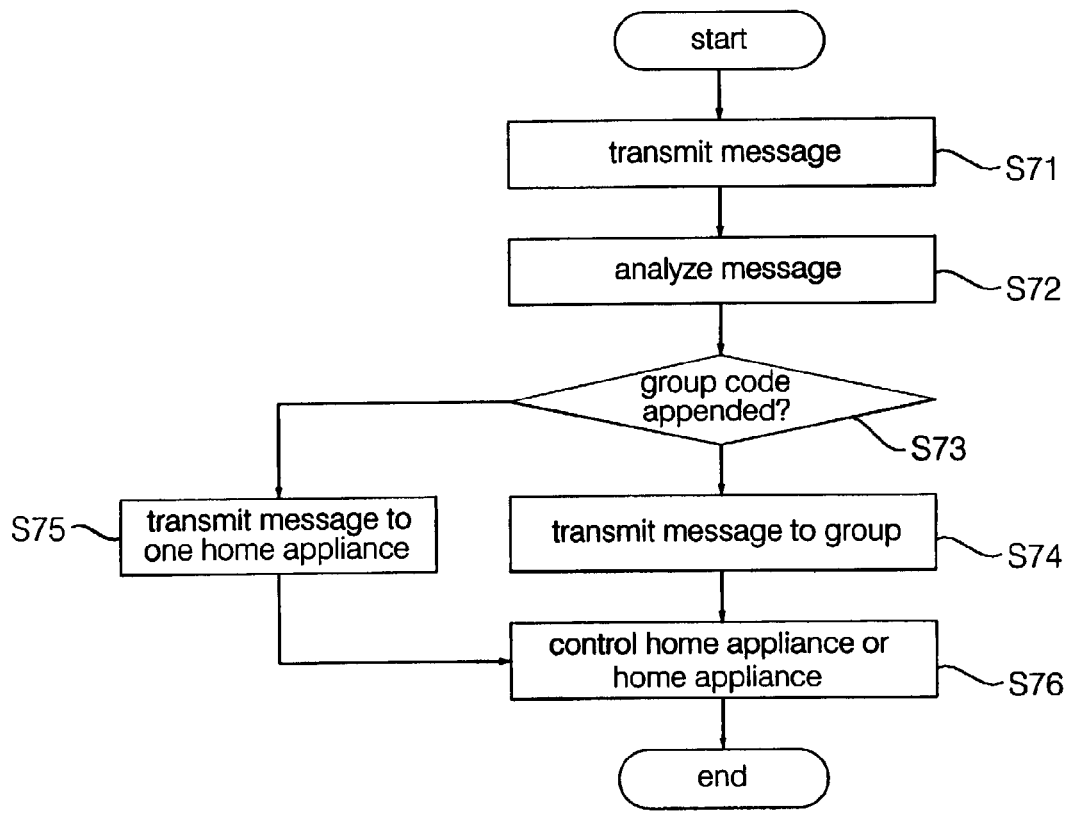
FIG. 6 is a flow chart illustrating a group control command-based home appliance control procedure of the message transmission/reception method for the home appliance networking system in accordance with the present invention.

FIG. 6 is a flow chart illustrating a group control command-based home appliance control procedure of the message transmission/reception method for the home appliance networking system in accordance with the present invention.

First, a home appliance control message is transmitted (S71). Then, the transmitted message is analyzed (S72). A determination is made from the message analysis result of step S72 as to whether a destination address appended to the message is a group code or a home appliance address (S73).

If the appended destination address is determined to be the group code at the above step S73, the above message is transmitted to a plurality of home appliances of a specific group corresponding to the group code (S74).

Alternatively, in the case where the appended destination address is determined to be the home appliance address at the above step S73, the above message is transmitted to a destination home appliance corresponding to the home appliance address (S75).

Thereafter, the destination home appliance or the plurality of home appliances of the specific group are controlled according to the transmitted message (S76).

As apparent from the above description, the present invention provides a method for transmitting and receiving messages in a home appliance networking system, wherein a first home appliance connected to a network appends a unique message identification number to a header of a message and transmits the resulting message to a second home appliance connected to the network, thereby enabling messages transmitted and received among a plurality of home appliances to be distinguished from one another, resulting in a reduction in message transfer errors. Furthermore, as needed, a group code corresponding to a specific group of home appliances may be appended to a transmitter message for control of the specific group so that the home appliances can be conveniently and efficiently controlled at one time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting and receiving messages in a home appliance networking system, comprising the steps of:
   a) allowing a first home appliance having an address and a transmitter message to be transmitted to append a unique number that differs from the home appliance address for identification of said transmitter message to a header of said message;
   b) allowing said first home appliance to transmit said transmitter message appended with said unique number to a second home appliance over a network; and
   c) allowing said second home appliance to receive said transmitter message transmitted from said first home appliance, create a receiver message in response to the received transmitter message, append the same message number as said unique number appended at said step a) to a header of the created receiver message, and then transmit the resulting receiver message to said first home appliance wherein the unique number identifies the appliance and message.

2. The method as set forth in claim 1, wherein said step a) includes the step of attaching an address of said first home appliance to a head of said unique number to enable distinction of said transmitter message transmitted from said first home appliance from transmitter messages with the same unique number transmitted from other home appliances.

3. The method as set forth in claim 1, wherein said step c) includes the steps of: c-1) creating said receiver message in response to said transmitter message transmitted from said first home appliance; and c-2) transmitting the created receiver message to said first home appliance.

4. The method as set forth in claim 3, wherein said step c) further includes the step of: c-3) after said receiver message corresponding to said transmitter message is transmitted, creating and transmitting a receiver message corresponding to a next transmitter message in the order of transmitter message transmission.

5. The method as set forth in claim 3, wherein said step c) further includes the step of: c-3) discarding a different transmitter message transmitted to said second home appliance before said receiver message corresponding to said transmitter message transmitted from said first home appliance is created and transmitted.

6. The method as set forth in claim 5, wherein said step c) further includes the step of: c-4) allowing a home appliance transmitting said different transmitter message discarded by said second home appliance to retransmit said different transmitter message to said second home appliance until a receiver message corresponding to said different transmitter message is transmitted from said second home appliance.

7. The method as set forth in claim 1, wherein said step c) includes the step of accepting transmitter messages transmitted from other home appliances connected to said network simultaneously with said transmitter message transmitted from said first home appliance, creating receiver messages corresponding respectively to the transmitted transmitter messages, appending corresponding unique numbers respectively to the created receiver messages and transmitting the resulting receiver messages.

8. A method for transmitting and receiving messages in a home appliance networking system, comprising the steps of:
   a) allowing a first home appliance transmitting a message over a network to append an address of a home to which a second home appliance belongs, to said message;
   b) allowing said first home appliance to additionally append an address of said second home appliance to said message appended with said home address;
   c) allowing said first home appliance to transmit said message appended with said home address and appliance address to said second home appliance; and
   d) controlling said second home appliance according to the transmitted message.

9. The method as set forth in claim 8, wherein said step b) includes the step of additionally appending an address of said first home appliance to said message.

10. The method as set forth in claim 8, wherein said step b) includes the step of additionally appending a group code to said message, said group code indicating that said message must be transmitted to a specific group of home appliances.

11. The method as set forth in claim 10, wherein said step c) includes the steps of: c-1) analyzing a destination address appended at said step b) to determine whether said destination address is said group code; and c-2) transmitting said message to said home appliances of said specific group if said destination address is determined to be said group code at said step c-1).

12. A method for transmitting and receiving messages in a home appliance networking system, comprising the steps of:
   a) allowing a first home appliance having an address and a transmitter message to be transmitted to append a unique number that differs from the home appliance address for identification of said transmitter message to a header of said message;
   b) allowing said first home appliance to transmit said transmitter message appended with said unique number to a second home appliance over a network; and
   c) allowing said second home appliance to receive said transmitter message transmitted from said first home appliance, create a receiver message in response to the received transmitter message, append the same message number as said unique number appended at said step a) to a header of the created receiver message, and then transmit the resulting receiver message to said first home appliance,
   wherein the unique number identifies the appliance and message.

13. The method of claim 1, wherein the unique number is arbitrarily set or assigned.

* * * * *